United States Patent
Heinhaupt et al.

(10) Patent No.: US 12,220,945 B2
(45) Date of Patent: Feb. 11, 2025

(54) PNEUMATIC VEHICLE TYRE

(71) Applicant: Continental Reifen Deutschland GmbH, Hannover (DE)

(72) Inventors: Torsten Heinhaupt, Celle (DE); Jürgen Brockmann, Hannover (DE); Matthew Lamb, Waxhaw, NC (US); Claudia Bauer, Bad Nenndorf (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 18/252,369

(22) PCT Filed: Nov. 1, 2021

(86) PCT No.: PCT/DE2021/200166
§ 371 (c)(1),
(2) Date: May 10, 2023

(87) PCT Pub. No.: WO2022/100797
PCT Pub. Date: May 19, 2022

(65) Prior Publication Data
US 2024/0001716 A1   Jan. 4, 2024

Related U.S. Application Data

(60) Provisional application No. 63/111,678, filed on Nov. 10, 2020.

(30) Foreign Application Priority Data

Nov. 25, 2020   (DE) ................. 10 2020 214 762.0

(51) Int. Cl.
*B60C 11/03* (2006.01)

(52) U.S. Cl.
CPC ...... *B60C 11/0309* (2013.01); *B60C 11/0306* (2013.01); *B60C 2011/0365* (2013.01);
(Continued)

(58) Field of Classification Search
CPC ..... B60C 2011/0381; B60C 2011/0383; B60C 11/0302; B60C 11/0306; B60C 11/11
See application file for complete search history.

(56) References Cited

U.S. PATENT DOCUMENTS 5,435,366 A * 7/1995 Voigt .................. B60C 11/0306
152/DIG. 3
2004/0134580 A1 * 7/2004 Colombo ................ B60C 11/12
152/209.16

(Continued)

FOREIGN PATENT DOCUMENTS

CN       203974427 U     12/2014
DE       4300695 A1      7/1994
(Continued)

OTHER PUBLICATIONS

International Search Report dated Jan. 4, 2022 of International Application PCT/DE2021/200166 on which this application is based.

*Primary Examiner* — Robert C Dye
(74) *Attorney, Agent, or Firm* — Richard A. Wolf; Gregory Adams

(57) ABSTRACT

A pneumatic vehicle tire having a tread with at least one profile block row delimited at each side by a respective circumferential channel which is divided into profile blocks by transverse channels which open into both circumferential channels and run parallel to one another in plan view. Each transverse channel, in plan view, is made up of two channel portions which adjoin one another at an obtuse angle of 100° to 160°. In each profile block there is a blind channel which opens into both channel portions of a transverse channel and
(Continued)

Figure 1:
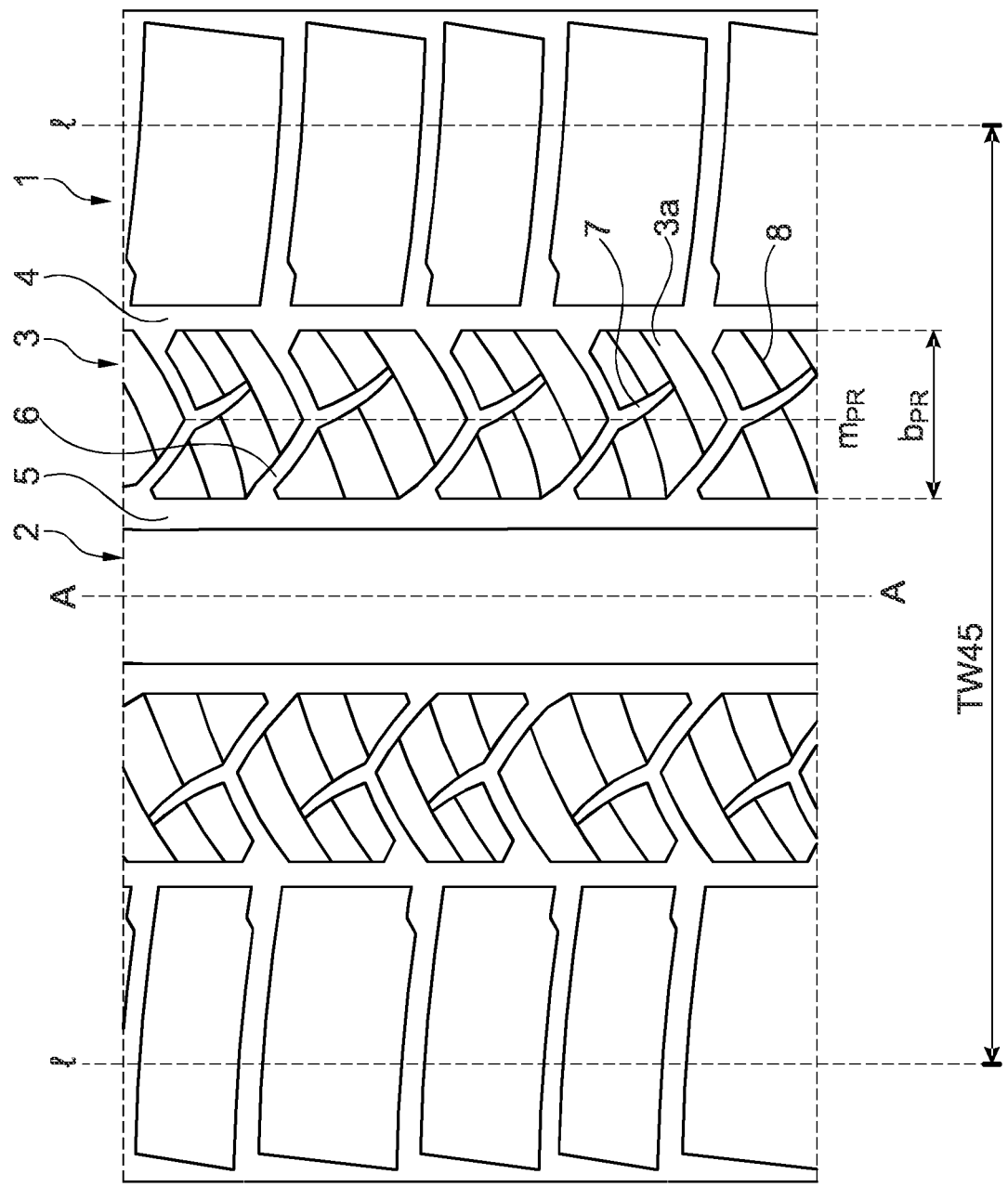

which is elongate in plan view and, with the transverse channel, forms a channel combination running in a Y shape in plan view, which blind channel has a width, determined at the tread periphery, of 1.0 mm to 6.0 mm and runs at an angle of 0° to 60° with respect to the circumferential direction.

20 Claims, 3 Drawing Sheets

(52) U.S. Cl.
CPC ............... *B60C 2011/0369* (2013.01); *B60C 2011/0372* (2013.01); *B60C 2011/0381* (2013.01); *B60C 2011/0388* (2013.01)

(56) References Cited

U.S. PATENT DOCUMENTS

| | | | |
|---|---|---|---|
| 2012/0160385 A1* | 6/2012 | Tanaka | ............... B60C 11/0306 |
| | | | 152/209.22 |
| 2019/0283506 A1 | 9/2019 | Iwata | |
| 2019/0308463 A1* | 10/2019 | Nagase | ............... B60C 11/1263 |

FOREIGN PATENT DOCUMENTS

| | | |
|---|---|---|
| EP | 2748017 A1 | 7/2014 |
| EP | 3300926 A1 | 4/2018 |
| JP | 2011068324 A | 4/2011 |

\* cited by examiner

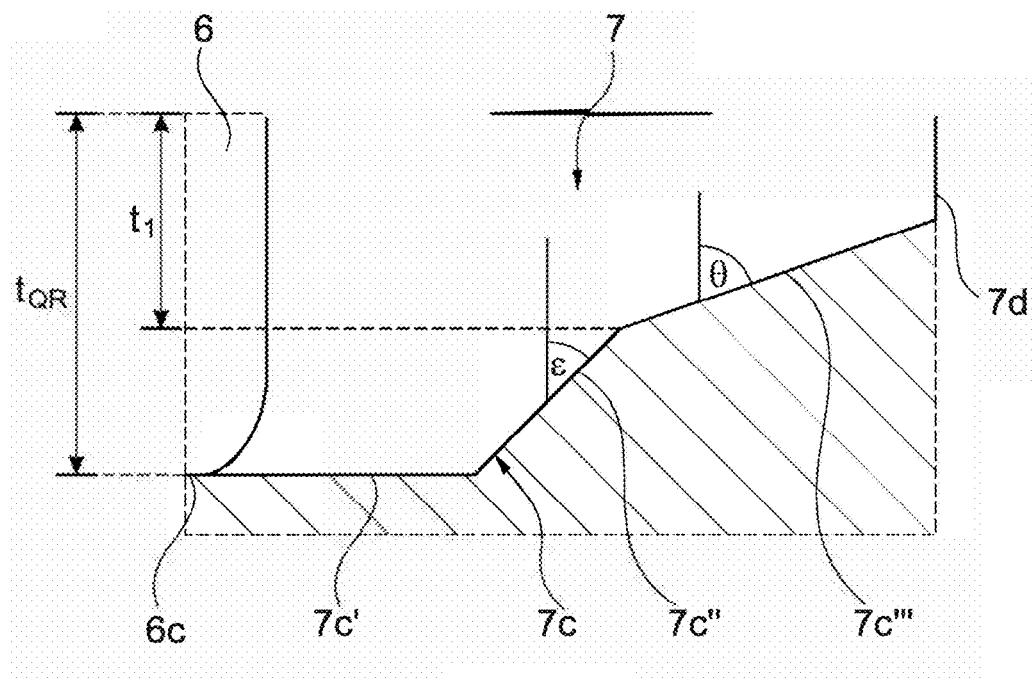
Fig. 3 III-III

PNEUMATIC VEHICLE TYRE

The invention relates to a pneumatic vehicle tyre having a tread with at least one profile block row, which is delimited at each side by a respective circumferential channel and which is divided into profile blocks by a multiplicity of transverse channels which open into both circumferential channels and which run parallel to one another in plan view, wherein each transverse channel, as seen in plan view, is made up of two channel portions which adjoin one another at an obtuse angle of 100° to 160°.

Such a pneumatic vehicle tyre is known for example from EP 3 300 926 A1. The tyre has a tread which is divided by a central circumferential channel and two shoulder-side circumferential channels into two shoulder-side profile block rows and two central profile block rows. The central profile block rows are divided into profile blocks by transverse channels which open into the circumferential channels, wherein the transverse channels are each made up of two channel portions which adjoin one another at an obtuse angle of 130° to 150°, wherein the channel portion which opens into the shoulder-side circumferential channel is shorter than the channel portion which opens into the central circumferential channel. Formed in each profile block is an additional channel, which runs straight in plan view and at an angle of 5° to 15° with respect to the circumferential direction, between transverse channels adjacent in the circumferential direction, which additional channel divides the respective profile block into block parts of substantially the same size and widens in the form of a funnel in the direction of the shoulder-side circumferential channel. Furthermore, a base elevation is formed in the transverse channels at the wider ends of the additional channels. The tyre has a very good balance of the properties desired for good year-round suitability, especially in respect of tread stiffness, which is responsible for the handling properties, of the water drainage capacity, which ensures the aquaplaning properties, and the driving properties on snow.

The profiling of treads with transverse channels opening into circumferential channels is favorable, on the one hand, especially as regards the drainage of the tread (shorter water displacement paths) and, on the other hand, by virtue of the transverse channel edges made available, for the wet and snow grip properties. Channels that open into the transverse channel also contribute to the drainage of the tread and to the improvement of the wet and snow grip properties. However, in the case of the previously known tread profiles, these properties are not optimally matched to the dry performance of the tyre. In particular, there is the risk that profile modifications carried out to improve the snow grip properties are accompanied by a deterioration in the dry performance and/or the drainage properties.

It is the underlying object of the invention, in the case of a pneumatic vehicle tyre of the type stated at the outset, to improve the snow grip properties when cornering forces occur, while maintaining good dry performance and good drainage properties.

According to the invention, the stated object is achieved by virtue of the fact that in each profile block there is formed a blind channel which opens into both channel portions of a transverse channel and which is elongate in plan view and which, with the transverse channel, forms a channel combination running in a Y shape in plan view, which blind channel has a width, determined at the tread periphery, of 1.0 mm to 6.0 mm and runs at an angle of 0° to 60° with respect to the circumferential direction.

When driving on snow, snow is accumulated and compacted in the blind channels in a particularly effective manner, thereby intensifying the effect of snow/snow friction—in comparison with continuous additional channels—and in this way improving the snow grip properties when cornering forces occur. Since the blind channels do not pass through the profile blocks, a high stiffness of the profile rib, which is advantageous for dry performance, is maintained. By means of the Y-shaped channel combination, water taken up by the blind channels is discharged in an effective manner in both "axial directions" via the channel portions of the transverse channels, that is to say both circumferential channels delimiting the central profile rib, so that furthermore good drainage properties are maintained.

According to a preferred embodiment, the angle at which the blind channel runs with respect to the circumferential direction is 10° to 60°, in particular 20° to 50°. Such an oblique position of the blind channel is favorable for the action of the channel edges of the blind channel under loads which have a force component acting in the circumferential direction, and therefore this measure contributes to an improvement of the snow grip properties. Furthermore, in the case of an oblique blind channel under a load acting in the circumferential direction, in particular during braking, supporting effects occur to a greater extent in comparison with a blind channel running exactly in the circumferential direction, and these effects are favorable for block stiffness and therefore for dry performance.

According to a further preferred embodiment, the blind channel, in plan view, runs in a bent manner in such a way that its angle at which it runs with respect to the circumferential direction increases by 15° to 40°, in particular by 20° to 30°, from its channel end situated at the transverse channel to its channel end situated within the profile block. In particular, this contributes to effective snow compaction in the blind channel when driving on snow, thereby further improving the snow grip properties when cornering forces occur.

It is advantageous for the stiffness of the profile block if—with reference to its channel center line—the blind channel has a distance, determined in the circumferential direction at the tread periphery, of at least 3.0 mm, and preferably of at most 15.0 mm, from its channel end situated within the profile block to the transverse channel, adjoining the profile block, from which the blind channel does not originate. This measure helps to maintain a stiffness which is advantageously high for dry performance.

In this context, it is furthermore advantageous if—with reference to its channel center line—the blind channel has a distance, determined in the axial direction at the tread periphery, of at least 3.0 mm, and preferably of at most 15.0 mm, from its channel end situated within the profile block to the circumferential channel which is in each case closest.

According to a further preferred embodiment, the width of the blind channel decreases continuously, starting from the transverse channel, over the entire extent of the blind channel, wherein the width of the blind channel at its channel end situated within the profile block amounts to 30% to 80%, in particular 50% to 70%, of the width of the blind channel at the transverse channel. Blind channels with such a decreasing width contribute to the maintenance of a high stiffness of the profile blocks and in this way to the maintenance of dry performance. At the same time, snow can be compacted particularly well in such a blind channel when driving on a snow-covered roadway, and this is favorable for the snow grip properties.

According to a further preferred embodiment, the blind channel has a depth in the radial direction which decreases from the transverse channel in the direction of its channel end situated within the profile block. This contributes to faster compaction of snow in the blind channel when driving on a snow-covered roadway. Furthermore, this measure is advantageous in respect of stiffness and dry performance.

For the drainage properties, it is of additional advantage if the depth of the blind channel at the transverse channel corresponds to the depth of the transverse channel. As a result, water taken up by the blind channel can flow off into the transverse channel with little turbulence.

The depth of the blind channel at its channel end situated within the profile block is preferably 2.0 mm to 3.0 mm.

According to a further preferred embodiment, the blind channel is delimited in the radial direction by a channel base, which, as seen in the longitudinal section aligned along the channel center line of the blind channel, is made up of a first base portion, which adjoins the channel base of the transverse channel and extends in the depth of the transverse channel, a central, second base portion and a third base portion, wherein the second base portion runs at an angle of 40° to 50° with respect to the radial direction and the third base portion runs at an angle of 65° to 75° with respect to the radial direction, and wherein the third base portion adjoins the second base portion at a depth, determined in the radial direction, of 50% to 85%, in particular of 65% to 75%, of the depth of the transverse channel. The base portions contribute to a stabilization of the profile block in the region of the blind channel, and are therefore favorable for the stiffness of the profile block and thus for dry performance. Furthermore, the base portions promote snow compaction in the blind channel and thus contribute to a further improvement of the snow grip properties when cornering forces occur.

Another preferred embodiment is characterized in that, as seen in plan view and with reference to the channel center line, the channel portions of the transverse channel each run at an angle of 10° to 40°, in particular of 20° to 35°, to the axial direction. This is advantageous especially for the drainage properties.

It is furthermore preferred if the channel portions of the transverse channel are bent, in plan view, in such a way that—starting from an inflection point present on the channel center line at the mutual connection of the channel portions—their angle to the axial direction increases by 5° to 25°, in particular by 10° to 20°, in the direction of the circumferential channels. This promotes rapid drainage of water into the circumferential channels.

Another preferred embodiment is characterized in that the angles of the channel portions to the axial direction—determined at an inflection point present on the channel center line at the mutual connection of the channel portions—coincide or deviate from one another by at most 10°.

The obtuse angle at which the channel portions of the transverse channel adjoin one another is preferably 110° to 140°, preferably 115° to 135°.

According to a further preferred embodiment, the channel portions of the transverse channel have, at their mutual connection, an inflection point on the channel center line which is within a distance, determined in the axial direction from the profile block row center line, of up to 10%, preferably up to 5%, of the width of the central profile block row, determined in the axial direction at the tread periphery. This contributes to uniform drainage of the profile block.

Figure 2:
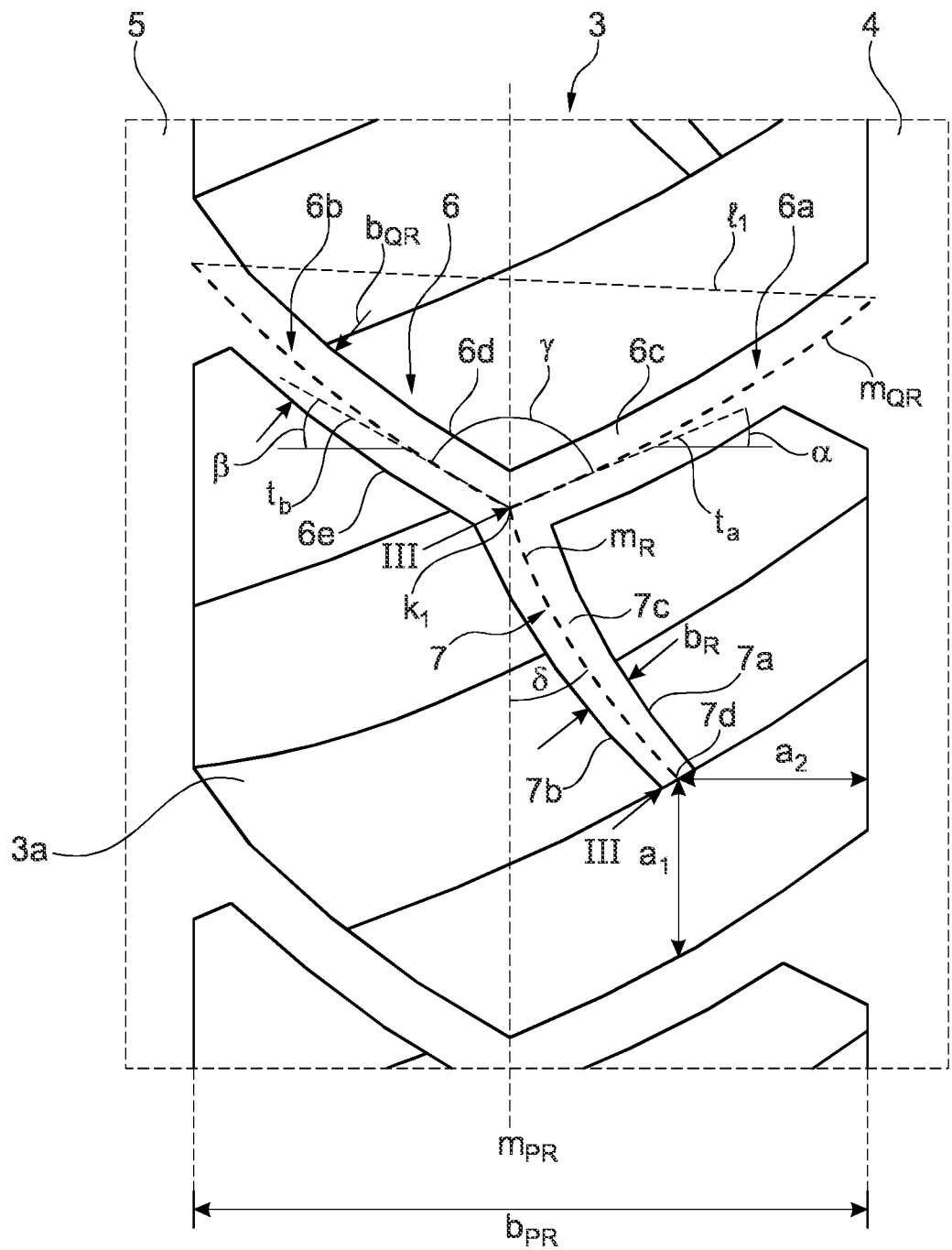

Further features, advantages and details of the invention will now be described in more detail with reference to the drawing, which schematically shows an exemplary embodiment of the invention. In the drawing:

FIG. 1 shows a plan view of a circumferential portion of a tread of a pneumatic vehicle tyre with a design variant of the invention, FIG. 2 shows an enlarged plan view of the tread in the region of a profile block, and FIG. 3 shows a further enlarged section along the line Ill-Ill in FIG. 2.

Pneumatic vehicle tyres which are designed according to the invention are tyres for motor vehicles, in particular for multitrack vehicles, and preferably tyres of radial type of construction for passenger motor vehicles, vans or light trucks, wherein the tyres are provided for use under wintry driving conditions.

FIG. 1 shows a plan view of a circumferential portion of a tread of a pneumatic vehicle tyre. The tyre equatorial plane is indicated by a dashed line A-A. The tread has a tread width TW45 in the axial direction which is determined between two lines l running in the circumferential direction. Each line l appears, as seen in the cross section of the tyre, as a point which lies on the outer contour line (of the envelope) of the tyre and at which a tangent applied to the outer contour line forms an angle of 45° with the radial direction (vertical line). The width TW45 is determined with the pneumatic vehicle tyre mounted on a standard nm in accordance with E.T.R.T.O. standards at a tyre pressure of 0.1 bar and without a load.

The tread has two shoulder-side profile block rows 1, a central profile rib 2 running in the region of the tyre equatorial plane (line A-A) and two central profile block rows 3 running in the different tread halves. The shoulder-side profile block rows 1 are separated from the central profile block rows 3 by shoulder-side circumferential channels 4, which run straight in plan view. Central circumferential channels 5 that run straight in plan view separate the central profile rib 2 from the central profile block rows 3. The circumferential channels 4, 5 are formed in the radial direction to the respectively provided profile depth, which is typically 6.5 mm to 10.0 mm for the preferred tyre type.

The shoulder-side profile block rows 1 and the central profile rib 2 are shown in simplified form and can be embodied in a manner known per se.

Each central profile block row 3 has a maximum width $b_{PR}$ of 15% to 23%, in particular of 17% to 21%, of the tread width TW45 in the axial direction at the tread periphery, as well as a profile block row center line $m_{PR}$ which runs in the circumferential direction in plan view and bisects the central profile block row 3 with respect to its width $b_{PR}$. Furthermore, each central profile block row 3 is provided with a multiplicity of transverse channels 6, which run parallel to one another in plan view and in each case in a shallow V shape and open into the corresponding shoulder-side circumferential channel 4 and the corresponding central circumferential channel 5, which structure the respective profile block row 3 into profile blocks 3a. Starting from each transverse channel 6, in the region of its V-tip, there is a blind channel 7, which runs into the respective profile block 3a and ends therein and which forms a Y-shaped channel combination with the transverse channel 6 in plan view.

The Y-shaped channel combinations of the central profile block row 3 situated in one tread half are rotated by 180° in plan view with respect to the Y-shaped channel combinations of the central profile block row 3 situated in the other tread half. The further configuration of the transverse channels 6 and blind channels 7 is explained below with reference to a single Y-shaped channel combination.

FIG. 2 shows an enlarged plan view in the region of a Y-shaped channel combination from the central profile block row 3 on the right in FIG. 1. In the case of the transverse channel 6, the channel center line $m_{QR}$, which follows the channel path and reaches as far as the circumferential channels 4, 5, is drawn in dashed lines and, corresponding to the V-shaped path of the transverse channel 6, has in the region of the V tip of the transverse channel 6 an inflection point $k_1$ which is situated on the profile block row center line $m_{PR}$ in the exemplary embodiment shown. Alternatively, the inflection point $k_1$ can be situated within a distance, determined in the axial direction from the profile block row center line $m_{PR}$, of up to 10%, preferably up to 5%, of the width $b_{PR}$ of the profile block row 3, and therefore the inflection point $k_1$ can be offset relative to the profile block row center line $m_{PR}$ both in the one axial direction (in the direction of the shoulder-side circumferential channel 4) and in the other axial direction (in the direction of the central circumferential channel 5).

As seen in plan view, the transverse channel 6 is made up of a channel portion 6a, which opens into the shoulder-side circumferential channel 4, and a channel portion 6b, which opens into the central circumferential channel 5, wherein—with reference to the channel center line $m_{QR}$—the channel portions 6a, 6b adjoin one another at the inflection point $k_1$ and—with reference to the axial direction—are inclined in opposite directions with respect to one another in accordance with the V-shaped path of the transverse channel 6. In plan view, channel portion 6a is slightly bent and at an angle α of 10° to 40°, in particular of 20° to 35°, to the axial direction—with reference to the channel center line $m_{QR}$—with the angle α increasing by 5° to 25°, in particular by 10° to 20°, in the direction of the shoulder-side circumferential channel 4, starting from the inflection point $k_1$. In plan view, channel portion 6b is likewise slightly bent and at an angle β of 10° to 40°, in particular of 20° to 35°, to the axial direction—with reference to the channel center line $m_{QR}$—with the angle β increasing by 5° to 25°, in particular by 10° to 20°, in the direction of the central circumferential channel 5, starting from the inflection point $k_1$. The angles α and β preferably coincide at the inflection point $k_1$ or deviate from one another by at most 10° at this inflection point $k_1$. The sizes of the angles α and β are selected in such a way that—with reference to the channel center line $m_{QR}$—channel portion 6a and channel portion 6b enclose an angle γ which, when added to the angles α and β, gives a total of 180° and amounts to 100° to 160°, in particular 110° to 140°, and preferably 115° to 135°.

The transverse channel 6 is delimited by a channel base 6c, a channel flank 6d on the inside of the bend, and a channel flank 6e on the outside of the bend, wherein the channel flank 6d on the inside of the bend is closer—in comparison with the channel flank 6e on the outside of the bend—to a line $l_1$ running straight between the ends of the channel center line $m_{QR}$ in plan view. In the radial direction, the transverse channel 6 has a preferably constant depth $t_{QR}$ (FIG. 3) of 75% to 100%, in particular of 85% to 95%, of the profile depth and an at least substantially constant width $b_{QR}$ of 2.0 mm to 6.0 mm, in particular of at most 5.0 mm, determined perpendicularly to the channel center line $m_{QR}$.

The blind channel 7 adjoins both channel portions 6a, 6b of the transverse channel 6 and—in relation to the inflection point $k_1$ of the center line $m_{QR}$ of the transverse channel 6—extends in the opposite circumferential direction to the channel portions 6a, 6b. The blind channel 7 therefore adjoins the channel portions 6a, 6b via the channel flank 6e on the outside of the bend. As seen in plan view, the blind channel 7 is elongate along its channel center line $m_R$ following the channel path, wherein the channel center line $m_R$, which is continued into the transverse channel 6, meets the inflection point $k_1$ of the center line $m_{QR}$ of the transverse channel 6 in the exemplary embodiment shown. Alternatively, the channel center line $m_R$ continued into the transverse channel 6 can meet the center line $m_{QR}$ of the transverse channel 6 at a distance of up to 2.0 mm, in particular up to 1.0 mm, determined in the axial direction, from the inflection point $k_1$.

In the exemplary embodiment shown, the blind channel 7 runs with a slight bend in plan view and—with reference to the channel center line $m_R$—at an angle δ of 10° to 60°, in particular of 20° to 50°, with respect to the circumferential direction, wherein, starting from that channel end of the blind channel 7 which is situated at the transverse channel 6, the angle δ increases by 15° to 40°, in particular by 20° to 30°, toward that channel end of the blind channel 7 which is situated within the profile block 3a, and wherein, starting from the transverse channel 6, the blind channel 7 runs in the direction of the shoulder-side circumferential channel 4. In each case with reference to the channel center line $m_R$, the blind channel 7 has, from its end which is situated within the profile block 3a to that transverse channel 6 delimiting the profile block 3a from which the blind channel 7 does not originate, a distance $a_1$ determined in the circumferential direction at the tread periphery, and has a distance $a_2$ to the shoulder-side circumferential channel 4, determined in the axial direction at the tread periphery, wherein the distances $a_1$, $a_2$ are in each case at least 3.0 mm and preferably at most 15.0 mm.

The blind channel 7 is delimited by a channel flank 7a adjoining channel portion 6a of the transverse channel 6, a channel flank 7b adjoining channel portion 6b of the transverse channel 6, a channel base 7c (cf. FIG. 3) and an end flank 7d running between the channel flanks 7a, 7b. The channel flanks 7a, 7b and the end flank 7d (cf. FIG. 3), as seen in cross portion, run in the radial direction or at an angle of, in particular, up to 5° with respect to the latter. As FIG. 3 shows, as seen in longitudinal section aligned along the channel center line $m_R$, the channel base 7c is composed of a base portion 7c' adjoining the channel base 6c of the transverse channel 6 and running at the depth $t_{QR}$, a central base portion 7c" and a base portion 7c'". The central base portion 7c" runs at an angle ε of 40° to 50° with respect to the radial direction, as seen in the aforementioned longitudinal section. The base portion 7c'" adjoins the central base portion 7c" at a depth $t_1$, determined in the radial direction, of 50% to 85%, in particular of 65% to 75%, of the depth $t_{QR}$ and, as seen in the aforementioned longitudinal section, runs at an angle θ of 65° to 75° with respect to the radial direction. In the radial direction, the blind channel 7 has a depth which decreases from the transverse channel 6 in the direction of that end of the blind channel 7 which is situated within the profile block 3a, in particular to 2.0 mm to 3.0 mm. According to FIG. 2, the blind channel 7 has a width $b_R$, determined perpendicularly to the channel center line $m_R$, of 1.0 mm to 6.0 mm, in particular of 2.0 mm to 4.5 mm, at the tread periphery, wherein the width $b_R$ in the exemplary embodiment shown decreases continuously over the extent of the blind channel 7, starting from the transverse channel 6. The width $b_R$ of the blind channel 7 at its end flank 7d is 30% to 80%, in particular 50% to 70%, of the width $b_R$ of the blind channel 7 at the transverse channel 6.

The mentioned angles α, β, γ, δ, which describe the path of the transverse channel 6 and of the blind channel 7, respectively, are each determined relative to a tangent applied to the channel center line $m_{QR}$ and the channel center line $m_R$, respectively. FIG. 2 shows, by way of example, a tangent $t_a$ for the angle α running through the inflection point $k_1$ and applied to the channel center line $m_{QR}$, and a tangent $t_b$ for the angle β running through the inflection point $k_1$ and applied to the channel center line $m_{QR}$. The angle γ is determined between the tangent $t_a$ and the tangent $t_b$.

According to FIG. 1, the profile blocks 3a in the exemplary embodiment shown are each provided with a number of sipes 8 running parallel to one another in plan view and having a width of 0.4 mm to 0.8 mm and a maximum depth of 50% to 100% of the profile depth. Furthermore, the profile blocks 3a in the exemplary embodiment shown have beveled corner regions at the mouths of the transverse channels 6, in the region of the acute included angles present between the transverse channels 6 and the circumferential channels 4, 5, which corner regions can be formed in a known manner.

The invention is not limited to the exemplary embodiment described.

In particular, the tread has at least one central profile block row 3, wherein the central profile block row 3 can also be formed in the region of the tyre equatorial plane. The channel portions 6a, 6b of the transverse channels 6 as well as the blind channels 7 can each run straight in plan view. The angle δ at which the blind channels 7 run with respect to the circumferential direction in plan view is 0° to 60°, and therefore the blind channels 7 can also run in the circumferential direction. The width $b_R$ and the depth of the blind channel 7 can each be made constant. The circumferential channels do not have to run straight in plan view, but can run in a zig-zag shape, for example, in plan view.

LIST OF REFERENCE SIGNS

1 Shoulder-side profile block row
2 Central profile rib
3 Central profile block row
3a Profile block
4 Shoulder-side circumferential channel
5 Central circumferential channel
6 Transverse channel
6a Channel portion
6b Channel portion
6c Channel base
6d Channel flank on the inside of the bend
6e Channel flank on the outside of the bend
7 Blind channel
7a, 7b Channel flank
7c Channel base
7c', 7c", 7c''' Base portion
7d End flank
8 Sipe
A-A Line (tyre equatorial plane)
$a_1$, $a_2$ Distance
$b_R$, $b_{PR}$, $b_{QR}$ Width
$k_1$ Inflection point
l, $l_1$ Line
$m_R$ Channel center line
$m_{PR}$ Profile block row center line
$m_{QR}$ Channel center line
$t_a$, $t_b$ Tangent
$t_{QR}$, $t_1$ Depth
TW45 Tread width
α, β, γ, δ, ε, δ Angle

The invention claimed is:
1. A pneumatic vehicle tire tread comprising:
a block row delimited on each side by first and second circumferential channels, the block row divided into profile blocks by a plurality of transverse channels that open into the first and second circumferential channels;
each transverse channel comprises two channel portions that adjoin at an obtuse angle (γ) of 100° to 160°, and
a blind channel formed in each profile block which opens into the channel portions and which is elongate in plan view and which, with the transverse channel, forms a channel combination running in a Y shape in plan view, which the blind channel has a width (bR), determined at the tread periphery, of 1.0 mm to 6.0 mm and runs at an angle (δ) of 0° to 60° with respect to the circumferential direction,
wherein the blind channel, in plan view, runs in a bent manner in such a way that its angle (δ) at which it runs with respect to the circumferential direction increases by 15° to 40° from its channel end situated at the transverse channel to its channel end situated within the profile block.

2. The tire of claim 1, the angle (δ) at which the blind channel runs with respect to the circumferential direction is 10° to 60°.

3. The tire of claim 1, wherein the blind channel, in plan view, runs in a bent manner in such a way that its angle (δ) at which it runs with respect to the circumferential direction increases by 20° to 30° from its channel end situated at the transverse channel to its channel end situated within the profile block.

4. The tire of claim 1, with reference to its channel center line (mR)—the blind channel has a distance (a1), determined in the circumferential direction at the tread periphery, from 3.0 mm, and to 15.0 mm, from its channel end situated within the profile block to the transverse channel, adjoining the profile block, from which the blind channel does not originate.

5. The tire of claim 1, with reference to its channel center line (mR)—the blind channel has a distance (a2), determined in the axial direction at the tread periphery, from 3.0 mm to 15.0 mm, from its channel end situated within the profile block (3a) to the circumferential channel which is in each case closest.

6. The tire of claim 1, the width (bR) of the blind channel decreases continuously, starting from the transverse channel, over the entire extent of the blind channel, wherein the width (bR) of the blind channel at its channel end situated within the profile block amounts to 30% to 80%, of the width (bR) of the blind channel at the transverse channel.

7. The tire of claim 1, the blind channel has a depth in the radial direction which decreases from the transverse channel in the direction of its channel end situated within the profile block.

8. The tire of claim 1, the depth of the blind channel at the transverse channel corresponds to the depth (TQR) of the transverse channel.

9. The tire of claim 1, the depth of the blind channel at its channel end situated within the profile block is 2.0 mm to 3.0 mm.

10. The tire of claim 1, the blind channel is delimited in the radial direction by a channel base, which, as seen in the longitudinal section aligned along the channel center line (mR) of the blind channel, is made up of a first base portion, which adjoins the channel base of the transverse channel and extends in the depth (tQR) of the transverse channel, a central, second base portion and a third base portion, wherein the second base portion runs at an angle (ε) of 40° to 50° with respect to the radial direction and the third base portion runs at an angle (θ) of 65° to 75° with respect to the radial direction, and wherein the third base portion adjoins the second base portion at a depth (t1), determined in the radial direction, of 50% to 85%, of the depth (tQR) of the transverse channel.

11. The tire of claim 1, wherein, as seen in plan view and with reference to the channel center line (mQR), the channel portions of the transverse channel each run at an angle (α, β) of 10° to 40° to the axial direction.

12. The tire of claim 11, the channel portions of the transverse channel are bent, in plan view, in such a way that—starting from an inflection point (k1) present on the channel center line (mQR) at the mutual connection of the channel portions their angle (α, β) to the axial direction increases by 5° to 25° in the direction of the circumferential channels.

13. The tire of claim 11, the angles (α, β) of the channel portions to the axial direction—determined at an inflection point (k1) present on the channel center line (mQR) at the mutual connection of the channel portions —coincide or deviate from one another by at most 10°.

14. The tire of claim 1, the obtuse angle (α) at which the channel portions of the transverse channel adjoin one another is 110° to 140°.

15. The tire of claim 1, the channel portions of the transverse channel have, at their mutual connection, an inflection point (k1) on the channel center line (mQR) which is within a distance, determined in the axial direction from the profile block row center line (mPR), of up to 10%, of the width (bPR) of the central profile block row (3), determined in the axial direction at the tread periphery.

16. A pneumatic vehicle tire tread comprising:
a block row delimited on each side by first and second circumferential channels, the block row divided into profile blocks by a plurality of transverse channels that open into the first and second circumferential channels;
each transverse channel comprises two channel portions that adjoin at an obtuse angle (γ) of 100° to 160°, and
a blind channel formed in each profile block which opens into the channel portions and which is elongate in plan view and which, with the transverse channel, forms a channel combination running in a Y shape in plan view, which the blind channel has a width (bR), determined at the tread periphery, of 1.0 mm to 6.0 mm and runs at an angle (δ) of 0° to 60° with respect to the circumferential direction,
wherein the blind channel is delimited in the radial direction by a channel base, which, as seen in the longitudinal section aligned along the channel center line (mR) of the blind channel, is made up of a first base portion, which adjoins the channel base of the transverse channel and extends in the depth (tQR) of the transverse channel, a central, second base portion and a third base portion, wherein the second base portion runs at an angle (ε) of 40° to 50° with respect to the radial direction and the third base portion runs at an angle (θ) of 65° to 75° with respect to the radial direction, and wherein the third base portion adjoins the second base portion at a depth (t1), determined in the radial direction, of 50% to 85% of the depth (tQR) of the transverse channel.

17. The tire of claim 16, wherein the third base portion adjoins the second base portion at the depth (t1), determined in the radial direction, of 65% to 75% of the depth (tQR) of the transverse channel.

18. A pneumatic vehicle tire tread comprising:
a block row delimited on each side by first and second circumferential channels, the block row divided into profile blocks by a plurality of transverse channels that open into the first and second circumferential channels;
each transverse channel comprises two channel portions that adjoin at an obtuse angle (γ) of 100° to 160°, and
a blind channel formed in each profile block which opens into the channel portions and which is elongate in plan view and which, with the transverse channel, forms a channel combination running in a Y shape in plan view, which the blind channel has a width (bR), determined at the tread periphery, of 1.0 mm to 6.0 mm and runs at an angle (δ) of 0° to 60° with respect to the circumferential direction, wherein, as seen in plan view and with reference to the channel center line (mQR), the channel portions of the transverse channel each run at an angle (α, β) of 10° to 40° to the axial direction, and
wherein the channel portions of the transverse channel are bent, in plan view, in such a way that-starting from an inflection point (k1) present on the channel center line (mQR) at the mutual connection of the channel portions—their angle (α, β) to the axial direction increases by 5° to 25° in the direction of the circumferential channels.

19. The tire of claim 18, wherein, as seen in plan view and with reference to the channel center line (mQR), the channel portions of the transverse channel each run at their angle (α, β) of 20° to 35° to the axial direction.

20. The tire of claim 18, wherein the channel portions of the transverse channel are bent, in plan view, in such a way that—starting from the inflection point (k1) present on the channel center line (mQR) at the mutual connection of the channel portions—their angle (α, β) to the axial direction increases by 10° to 20° in the direction of the circumferential channels; and
wherein the angles (α, β) of the channel portions to the axial direction—determined at the inflection point (k1) present on the channel center line (mQR) at the mutual connection of the channel portions—coincide or deviate from one another by at most 10°.

* * * * *